US007849327B2

(12) United States Patent
Leung et al.

(10) Patent No.: US 7,849,327 B2
(45) Date of Patent: Dec. 7, 2010

(54) TECHNIQUE TO VIRTUALIZE PROCESSOR INPUT/OUTPUT RESOURCES

(76) Inventors: Hin L. Leung, 63 Mirabelli Cir., San Jose, CA (US) 95134; Kushagra V. Vaid, 507 Whitechapel Ave., San Jose, CA (US) 95136; Amy L. Santoni, 9225 Limoncillo Dr., Austin, TX (US) 78750; Dale Morris, P.O. Box 774000 PMB 346, Steamboat Springs, CO (US) 80477; Jonathan Ross, 19630 NE. 125th Ct., Woodinville, WA (US) 98077

( * ) Notice: Subject to any disclaimer, the term of this patent is extended or adjusted under 35 U.S.C. 154(b) by 1067 days.

(21) Appl. No.: 11/040,261

(22) Filed: Jan. 19, 2005

(65) Prior Publication Data
US 2006/0236094 A1 Oct. 19, 2006

(51) Int. Cl.
*G06F 11/30* (2006.01)
*G06F 12/14* (2006.01)

(52) U.S. Cl. ...................... 713/189; 380/287
(58) Field of Classification Search ........ 710/1, 710/2, 36, 62, 104, 260; 713/2, 152, 189; 709/203, 224; 718/1, 100, 107; 711/1, 162; 380/287
See application file for complete search history.

(56) References Cited

U.S. PATENT DOCUMENTS

| 4,787,031 | A | * | 11/1988 | Karger et al. | 718/100 |
|---|---|---|---|---|---|
| 5,109,489 | A | * | 4/1992 | Umeno et al. | 710/36 |
| 5,388,224 | A | * | 2/1995 | Maskas | 710/104 |
| 5,881,282 | A | * | 3/1999 | Shipman | 713/2 |
| 6,061,710 | A | * | 5/2000 | Eickemeyer et al. | 718/107 |
| 6,782,411 | B2 | * | 8/2004 | Navare et al. | 709/203 |
| 7,032,108 | B2 | * | 4/2006 | Maynard et al. | 713/2 |
| 7,529,897 | B1 | * | 5/2009 | Waldspurger et al. | 711/162 |
| 2002/0152334 | A1 | * | 10/2002 | Holm et al. | 710/2 |
| 2002/0152344 | A1 | * | 10/2002 | Holm et al. | 710/260 |
| 2004/0025009 | A1 | * | 2/2004 | Camber et al. | 713/152 |
| 2004/0221150 | A1 | * | 11/2004 | Maynard et al. | 713/2 |
| 2005/0114586 | A1 | * | 5/2005 | Brice et al. | 711/1 |
| 2005/0149719 | A1 | * | 7/2005 | Kilroy | 713/152 |
| 2005/0289246 | A1 | * | 12/2005 | Easton et al. | 710/1 |
| 2006/0005190 | A1 | * | 1/2006 | Vega et al. | 718/1 |
| 2006/0230200 | A1 | * | 10/2006 | Bellows et al. | 710/62 |
| 2007/0061441 | A1 | * | 3/2007 | Landis et al. | 709/224 |

OTHER PUBLICATIONS

Victor, P; Computer Architecture and Organization in the Model Computer Engineering Curriculum; Nov. 5-8, 2003; IEEE, pp. 1-6.*

* cited by examiner

*Primary Examiner*—Kambiz Zand
*Assistant Examiner*—Monjour Rahim
(74) *Attorney, Agent, or Firm*—Thomas R. Lane

(57) ABSTRACT

A technique to improve the performance of virtualized input/output (I/O) resources of a microprocessor within a virtual machine environment. More specifically, embodiments of the invention enable accesses of virtualized I/O resources to be made by guest software without necessarily invoking host software. Furthermore, embodiments of the invention enable more efficient delivery of interrupts to guest software by alleviating the need for host software to be invoked in the delivery process.

9 Claims, 10 Drawing Sheets

TECHNIQUE TO VIRTUALIZE PROCESSOR INPUT/OUTPUT RESOURCES

FIELD

Embodiments of the invention relate to microprocessors and computer systems. More particularly, embodiments of the invention relate to at least one technique to improve processor and computer system performance when servicing interrupts from a virtualized input/output (I/O) resource.

BACKGROUND

As demand on computer system throughput continues to increase, consolidation and sharing of computing resources becomes more important. In particular, in many modern computer systems, numerous operating systems (OS's) may operate ("run") within the same computer system simultaneously. In order to enable these OS's to run at acceptable performance levels on the same computing hardware (i.e. same microprocessor or microprocessors), system designers have resorted to a technique known as "virtualization" of computing resources.

Virtualization of computing resources refers to any number of techniques used to share computing hardware resources among a number of operating systems and/or software applications (collectively referred to as "guest" software). Virtualization techniques can broadly be categorized as employing a "dedicated policy", in which computing hardware is partitioned and each partition is dedicated to particular guest software, or a "shared policy", in which computing hardware is allocated to a number of guest software according to some arbitration scheme, such as a time-based allocation algorithm (e.g., "time multiplexing"). Throughout this disclosure, the terms "virtual" and "guest" may be used interchangeably to describe certain aspects of the guest software and interrupts intended to be serviced by the guest software.

Computer systems using shared policy virtualization of computing resources can be subject to performance degradation, as allocating appropriate processor resources to guest software in a timely manner can be difficult as the number of guest software, such as operating systems, increases. Interrupts to a processor in the computing system, in particular, can be difficult to service in a timely manner as the number of interrupt sources increases. One type of interrupt that can be difficult for a processor to service, especially as the number of guest software to service the interrupts increases, is an input/output (I/O) interrupt.

I/O interrupts originate from devices and sources external to a processor, including keyboard controllers, mouse activity, and wireless adapters. In a shared resource virtualization configuration, a guest software program must continually allocate resources to servicing various I/O interrupts according to some arbitration scheme. In at least one prior art virtualization technique, guest software services I/O interrupts according to a priority level assigned to each interrupt and relies on virtualization software routines ("host" software) to assign the appropriate priority to the interrupts and notify the guest software of the interrupts.

Guest software typically retrieves I/O interrupt information from the host software by issuing commands, such as a "read" command, to control logic responsible for controlling processor resources, such as I/O. Furthermore, guest software typically adjusts the priority of various interrupts by issuing commands, such as a "write" command, to the processor resources. In at least one prior art technique, the host software intercepts certain read and write commands from the guest software, such as those pertaining to servicing I/O interrupts, so that the same processor resources may be used to service interrupts to a number of different guest software programs, such as a number of operating systems.

For example, in at least one prior art virtualization technique, host software may intercept read or write commands issued by the guest software to processor resources that are "privileged" (i.e. resources that may not be accessed directly except by trusted software, such as operating systems).

FIG. 1 illustrates a prior art virtual machine architecture including three virtual machines being executed by the same processing hardware. Each virtual machine includes a host, such as a virtual machine monitor (VMM), through which guest software, such as an operating system, communicates with the processing hardware. End-user software applications may run on the operating system. Other prior art virtual machine architectures may include fewer or more virtual machines than those depicted in FIG. 1.

One problem with some prior art I/O resource virtualization techniques that operate in a virtualization architecture similar to FIG. 1, is that as the number of I/O interrupts increases, thereby increasing the number of read and write commands to the processing resources by the guest software, the host software (e.g., VMM) must intercept and service an increasing number of commands from the guest software. Host software servicing commands from the guest software prevents the guest software from performing other operations until the host software has serviced the commands, diminishing the performance of the guest software.

For example, FIG. 2 is a flow chart illustrating a prior art technique of servicing read commands issued by a guest software program to retrieve I/O interrupt information from the processor resources. In FIG. 2, the read command issued from the guest software is intercepted by a host VMM, because the read command is issued to a privileged resource of the processor (illustrated in FIG. 1). The VMM retrieves the I/O interrupt from the processing resource and returns the interrupt to the guest software, which can then service the interrupt. Once the guest software has serviced the I/O interrupt, the VMM returns control to the guest software at the next instruction following the point in program order where the guest was interrupted by the I/O interrupt.

Similarly, FIG. 3 is a flow diagram illustrating a prior art technique of servicing write commands issued by the guest software to assign interrupt priority in response to receiving an I/O interrupt. In FIG. 3, the write command issued from the guest software is intercepted by a host VMM, because the write command is issued to a privileged resource of the processor (illustrated in FIG. 1). Dissimilar from the read case illustrated in FIG. 2, the VMM writes the command to a guest representation of the I/O resource stored in memory. If there is already an interrupt being serviced ("pending") by the guest ("guest interrupt") and the pending guest interrupt does not allow other lower priority guest interrupts to be serviced until the pending guest interrupt has been serviced (i.e. the pending guest interrupt has "masked" lower priority guest interrupts), then the VMM returns control to the guest software at the next instruction where the guest was interrupted by the write command, such that guest software can resume operation after servicing the pending I/O interrupt.

Alternatively, if there is a pending guest interrupt being serviced at the time the write command is intercepted by the VMM and the pending guest interrupt allows other lower priority guest interrupts to be serviced before the pending guest interrupt is serviced (i.e. the pending guest interrupt has "unmasked" lower priority guest interrupts), then the VMM will deliver the guest I/O interrupt to the guest for servicing.

Otherwise, if there is no pending guest interrupt at the time the VMM intercepts the write command from the guest, control is returned to the guest at the point at which the write command occurred and the guest resumes operation.

The VMM intercepts each of the read and write commands related to servicing I/O interrupts in the prior art I/O virtualization techniques illustrated in FIGS. 1 and 2, taking processing resources away from the guest software for periods of time. As the number of I/O interrupts increase either due to an increasing number of interrupt sources or an increasing number of interrupt targets (i.e. increasing number of guest software using the same processing resources), more processing resources are allocated to the VMM instead of the guest, thereby lowering performance of the guest. Prior art techniques have attempted to streamline the VMM, such that it will return control to the guest faster. However, there's a limit as to how much designers can optimize the VMM itself without reducing the necessary functionality of the VMM.

Performance in many modern computer systems is therefore at least partially dependent upon the performance of I/O resource virtualization techniques.

BRIEF DESCRIPTION OF THE DRAWINGS

Embodiments and the invention are illustrated by way of example and not limitation in the figures of the accompanying drawings, in which like references indicate similar elements and in which.

DETAILED DESCRIPTION

Embodiments of the invention described herein pertain to computer systems. More particularly, at least one embodiment of the invention relates to a virtualization technique for input/output resources of one or more microprocessors within a computer system or network.

Figure 4:
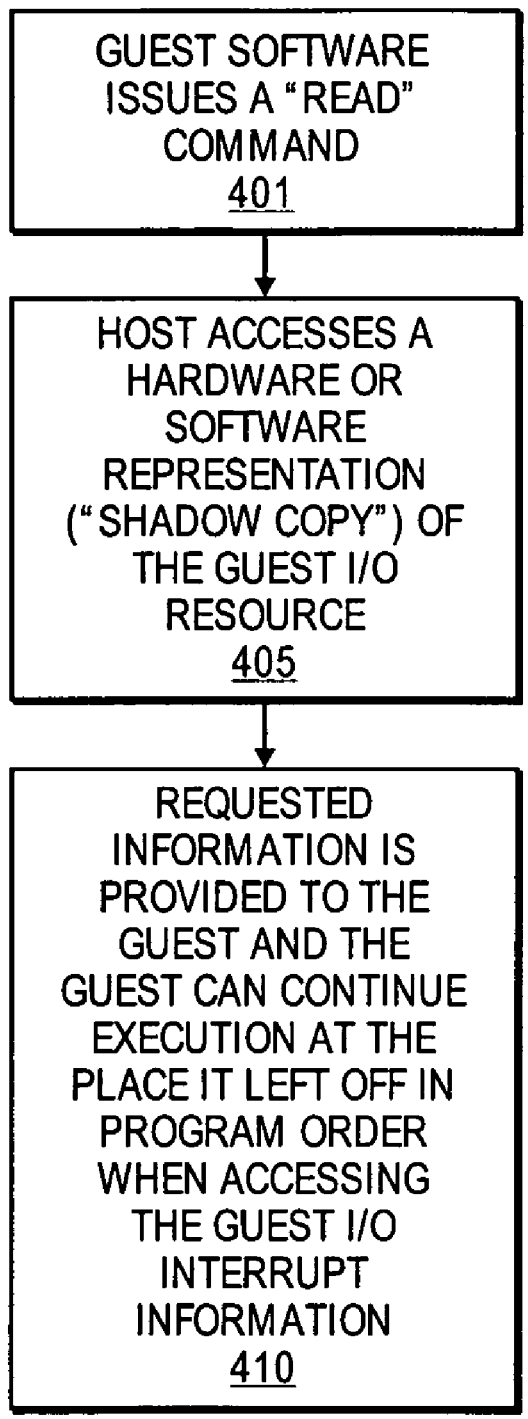
FIG. 4 is a flow diagram illustrating a technique for retrieving interrupt information from virtualized I/O resources according to one embodiment of the invention.

FIG. 4 is a flow diagram illustrating a technique for retrieving interrupt information from virtualized I/O resources according to one embodiment of the invention. In FIG. 4, guest software, such as an operating system, issues a "read" command at operation 401 to retrieve information pertaining to an input/output (I/O) interrupt that has occurred within a computer system in which the guest is executing or "running". However, instead of invoking host software, such as a virtual machine manager (VMM), as in the prior art, in the embodiment illustrated in FIG. 4, a hardware or software representation ("shadow copy") of information pertaining to the I/O resource is accessed, at operation 405, from the processor or from some memory structure within the computer system. The guest retrieves the information, at operation 410.

In one embodiment, the shadow copy is a data structure accessible within or via a processor abstraction layer (PAL), which is a software representation of various functions and information pertaining to the microprocessor(s) upon which the guest is running. The PAL may be implemented in processor-specific instructions, known as "firmware". In other embodiments, the shadow copy may be represented by various logical circuits within the processor or within some other semiconductor or memory device.

Figure 5:
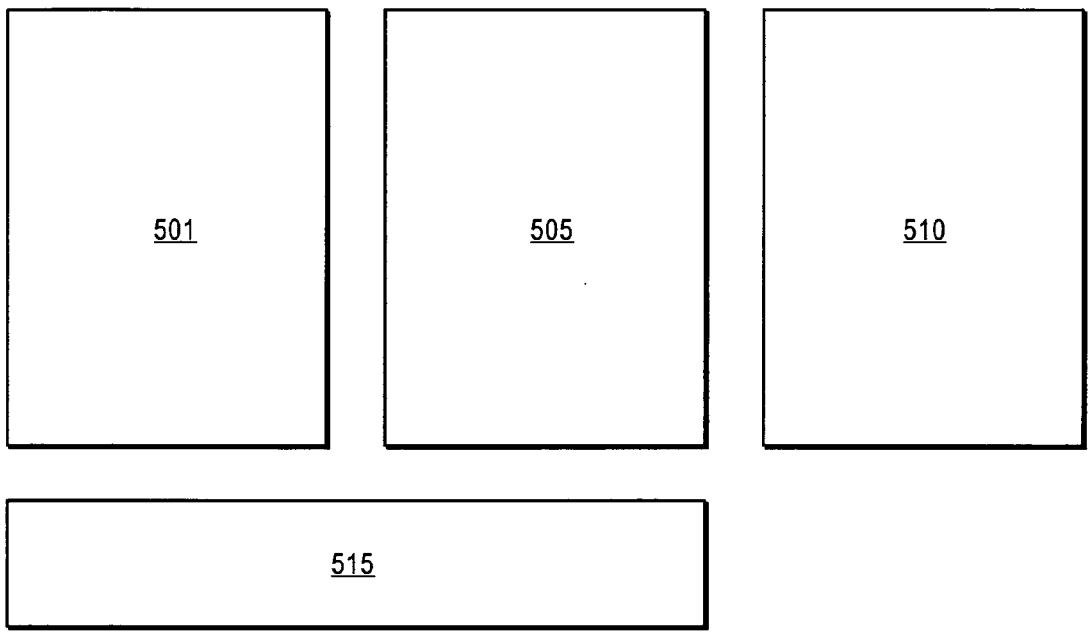
FIG. 5 is a block diagram of a processor abstraction layer (PAL) used in at least one embodiment of the invention.

FIG. 5 illustrates various functional blocks of a PAL that may be used in one embodiment of the invention. One or more of the functional blocks of the PAL may be accessed by the guest software, the host software (e.g., VMM) or both. Specifically, the PAL of FIG. 5 contains virtualization procedures 501 that comprise a complete or substantially complete set of routines used to represent or "virtualize" various resources within the processor. In one embodiment, guest software may use the virtualization procedures (via processor abstraction software, for example) rather than invoking a VMM. However, in other embodiments, guest software must invoke the host, such as a VMM, to access the virtualization procedures.

More commonly used virtualization services 505 may include a sub-set of services found in the virtualization procedures 501. In other embodiments, the virtualization services may include routines not found in the virtualization procedures 501. In one embodiment, the guest software can use the virtualization services without invoking host software, such as a VMM.

In such an embodiment, the technique illustrated in FIG. 4 allows information pertaining to an I/O interrupt to be retrieved by the guest without using the VMM, thereby avoiding execution delays in the guest that can result from using a VMM to retrieve I/O interrupt information. The PAL of FIG. 5 also includes PAL interception services 510 that can be accessed by a host, such as a VMM, when the host intercepts various commands from the guest to processor hardware. Finally, the PAL of FIG. 5 includes a virtual processor descriptor table 515 containing data structures to describe various functional attributes of the virtual (e.g., software) representation of the processor, such as state information. The virtual processor descriptor table may be used by the guest, the host, or both, depending upon the embodiment of the invention in which it is used.

In one embodiment of the invention, a host, such as a VMM, is only invoked (if at all) in response to a write command issued from guest software if a highest priority pending guest interrupt ("virtual highest priority interrupt, or 'VHPI'") is unmasked, unlike the prior art, which invoked the host whenever the guest issued a write command to the I/O resources. Therefore, in at least one embodiment of the invention, the guest may continue executing if the highest priority guest interrupt is masked (or if there is no pending guest interrupt) instead of being interrupted and waiting until the host determines whether the highest priority guest interrupt (if it exists) is masked before it can continue executing, thereby improving guest execution performance.

In one embodiment of the invention, a VHPI may mask lower priority interrupts via a combined status of a global virtual processor status register (VPSR) bit or bits and a local virtual task priority register (VTPR) bit or bits. The VPSR bit(s) determines whether the guest can accept any interrupts, whereas the VTPR bit(s) indicates whether the highest priority interrupt has masked lower priority interrupts, thereby preventing lower priority interrupts from being serviced. The following table summarizes the effect of VPSR and VTPR interrupt bits on whether a VMM is invoked to handle an incoming I/O interrupt:

| I/O-related Resource | Guest Read | Guest Write |
| --- | --- | --- |
| VPSR Interrupt bit | No VMM notification needed. Simply return the virtual copy of the value. | If guest is masking the PSR interrupt bit, no VMM intervention needed, just update the virtual copy of the PSR interrupt bit. If guest is unmasking the interrupt, VMM notification is needed only if guest TPR does not mask lower priority interrupts. |
| VTPR bits | | If guest is masking interrupts, no VMM notification needed. If guest is not masking interrupts, VMM notification is needed only if interrupt is enabled in guest PSR and guest TPR does not mask the interrupt. |

In one embodiment, the VPSR and VTPR are representations of processing hardware registers, PSR and TPR, respectively, within a memory storage area accessible by the guest software, thereby creating a "virtual" PSR (VPSR) and "virtual" TPR (VTPR) version of the PSR and TPR. In one embodiment, the VPSR contains a bit or group of bits, VPSR.i, to indicate whether all external interrupts are masked. Similarly, VTPR may contain a bit or group of bits, VTPR.mmi ("mmi" referring to "mask all maskable interrupts") and VTPR.mic ("mic" referring to "mask certain interrupt classes"), to indicate whether particular external interrupts are masked.

The rules illustrated in the above table can be implemented in one embodiment of the invention by masking all I/O interrupts intended to interrupt the guest ("guest I/O interrupts") if the VPSR.i bit is a certain value, such as 0. If VPSR.i is another value, such as 1, external interrupts intended to interrupt the guest ("guest external interrupts") may be masked or unmasked depending upon the status of the VTPR.mic and VTPR.mmi bits.

For example, in one embodiment of the invention, if VPSR.i has a value of 1 and VTPR.mmi has a value of 1, all guest I/O interrupts are masked except possibly for non-maskable interrupts intended to interrupt the guest ("guest non-maskable interrupts"). However, if VPSR.i has a value of 1 and VTPR.mmi has a value of 0, then all guest I/O interrupts are masked that have a priority equal or less to the value of VTPR.mic. The particular values of VPSR.i, VTPR.mic, and VTPR.mmi to represent information may be different among different embodiments.

In one embodiment of the invention, a processor may be able to service up to 256 interrupts, which may be grouped according to their priority. Among these 256 interrupts, some of them may correspond to I/O interrupts. Furthermore, in some embodiments the I/O interrupts may be distributed throughout the 256 interrupts. The following table summarizes the interrupt masking rules of a processor used in one embodiment of the invention:

| Priority Class (Highest Priority to Lowest) | Interrupt Number | PSR.i Value | Interrupt Masking Condition |
| --- | --- | --- | --- |
| 15 | 240 . . . 255 | PSR.i = 1 | Interrupt unmasked if: |
| 14 | 224 . . . 239 | | 1) TPR.mmi = 0 and |
| 13 | 208 . . . 223 | | 2) Interrupt is higher |
| 12 | 192 . . . 207 | | priority than HPI |
| 11 | 176 . . . 191 | | and |
| 10 | 160 . . . 175 | | 3) Vector number > TPR.mic |
| 9 | 144 . . . 159 | | |
| 8 | 128 . . . 143 | | |
| 7 | 112 . . . 127 | | |
| 6 | 96 . . . 111 | | |
| 5 | 80 . . . 95 | | |
| 4 | 64 . . . 79 | | |
| 3 | 48 . . . 63 | | |
| 2 | 32 . . . 47 | | |
| 1 | 16 . . . 31 | | |

Advantageously, embodiments of the invention only invoke the host (e.g., VMM) to handle write commands issued from the host if the interrupt unmasking conditions above are met. If the guest I/O interrupt is masked according to the above rules, then the guest I/O interrupt will be queued and the guest may continue executing until the interrupt is not masked, at which time the host may be invoked to commence handling the interrupt. In other embodiments, the host may not be invoked to deliver the guest I/O interrupt to the guest. Instead, the guest I/O interrupt may be delivered directly to the guest and serviced by the guest without the host being invoked.

Because guest interrupts are continuously pending and serviced, in order to determine whether a write command from guest software will, indeed, cause the VHPI to be unmasked, the VHPI is continuously maintained by the host, in one embodiment. In one embodiment, the VHPI is maintained in the shadow copy of the I/O resources by a VMM, and the VMM updates the VHPI status whenever a guest interrupt may need to be generated, such as when an I/O interrupt occurs requiring a guest interrupt to be generated in order to service the I/O interrupt.

Figure 6:
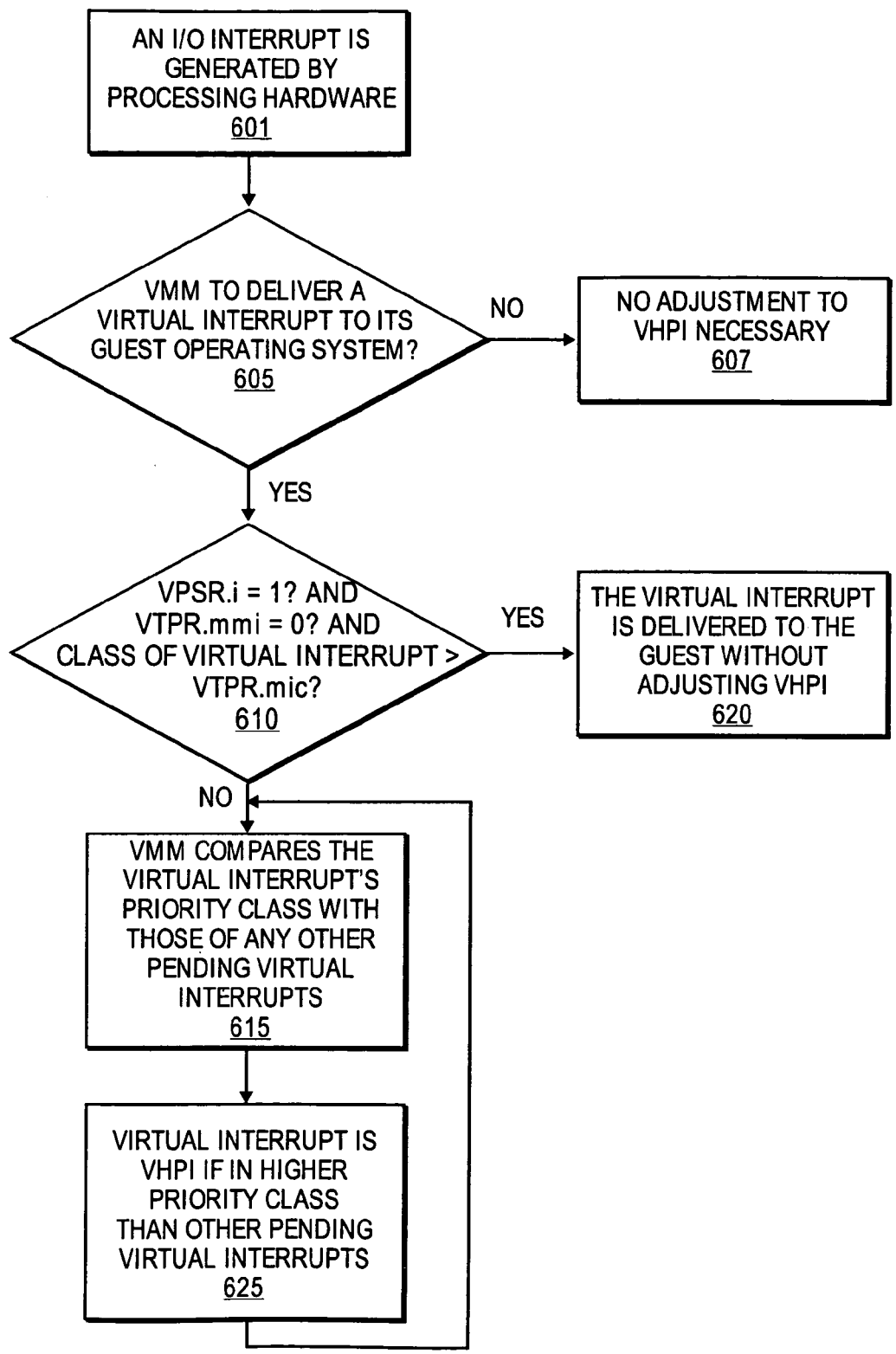
FIG. 6 is a flow diagram illustrating a technique for maintaining a vitual highest priority guest interrupt (VHPI), according to one embodiment of the invention.

FIG. 6 is a flow diagram illustrating how the VHPI is maintained by a VMM, according to one embodiment of the invention. When an I/O interrupt is generated by processing hardware, at operation 601, the VMM is invoked to handle the interrupt. In particular, the VMM within each virtual machine running on the processing hardware determines whether it should deliver a virtual interrupt to its guest operating system at operation 605. If not, then the VHPI is not affected, at operation 607, and the interrupt is handled without interrupting the guest.

If the VMM for a particular virtual machine does in fact determine that a virtual interrupt should be generated to the corresponding guest operating system, then at operation 610, the VMM determines whether the guest can accept any virtual interrupts, indicated by VPSR.i, for example, whether all maskable virtual interrupts are masked, indicated by VTPR.mmi, for example, and whether the class that the virtual interrupt is in is greater than the current virtual interrupt class priority, indicated by VTPR.mic, for example. If the virtual interrupt cannot be delivered to the guest, then the VMM compares the virtual interrupt's priority class, at operation 615, with those of any other pending virtual interrupts to determine whether the most recent virtual interrupt should be the VHPI. If the most recent virtual interrupt should be the VHPI, then it becomes VHPI at operation 625, otherwise the process is repeated. If the virtual interrupt can be delivered to the guest at operation 610, then the virtual interrupt is delivered to the guest according to the relative priority of the virtual interrupt at operation 620.

In one embodiment, the VMM compares the interrupt number of a most-recently received interrupt with the interrupt numbers of any pending virtual interrupts in order to determine the correct VHPI according to the interrupt number classes indicated in the above table. For example, if the most recently received interrupt has an interrupt number of 254 and all other pending virtual interrupts have interrupt numbers of less than 240, then the most recently received interrupt will correspond to the VHPI. However, if the most recently received interrupt has an interrupt number that is within the same class (e.g., 240-255 in the above table) as the current VHPI, then the VHPI will not be changed.

Figure 1:
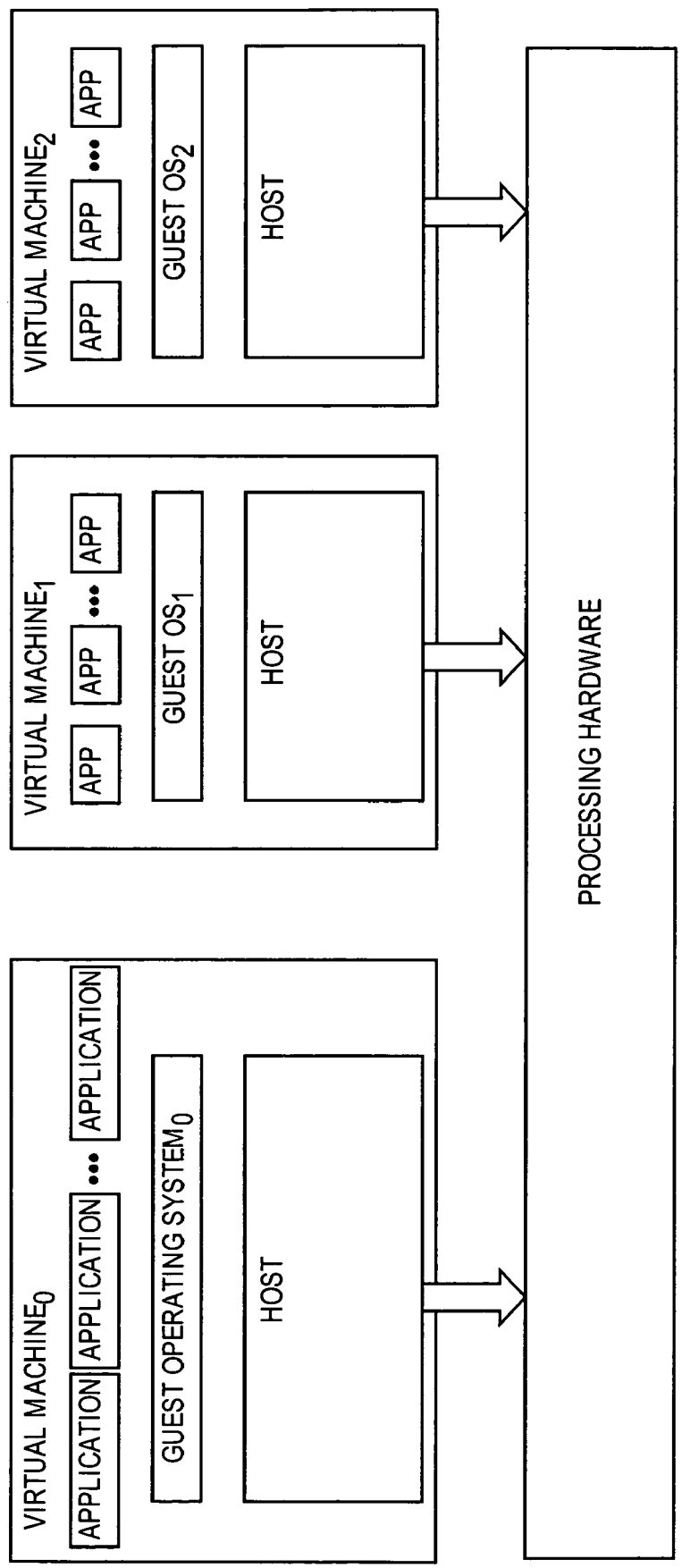
FIG. 1 illustrates a virtualization architecture that may be used in conjunction with prior art input/output (I/O) virtualization techniques.
Figure 2:
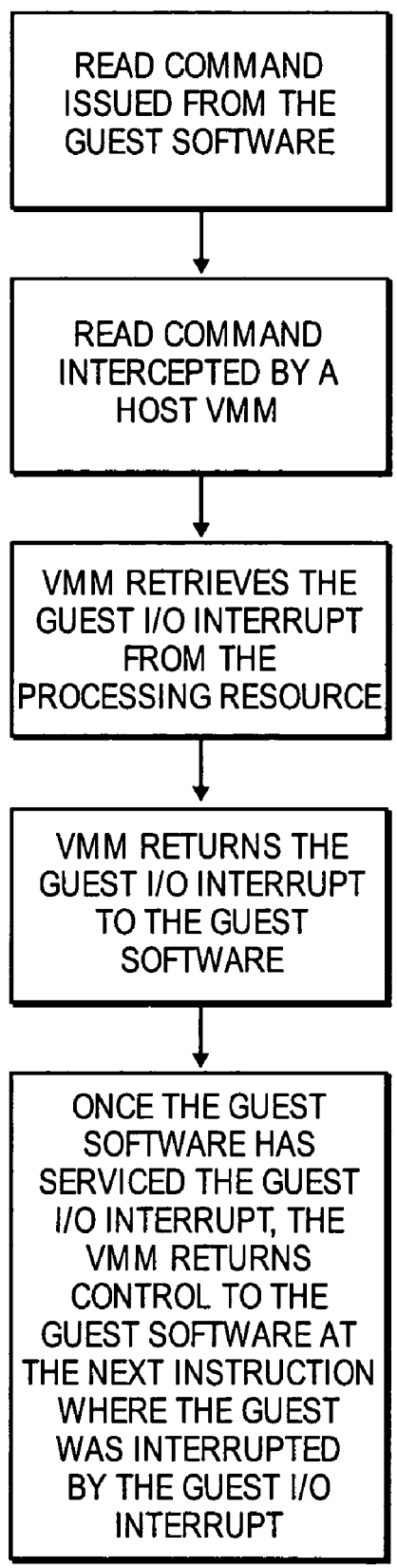
FIG. 2 is a flow diagram illustrating a prior art virtualization technique for retrieving I/O interrupt information by guest software.
Figure 3:
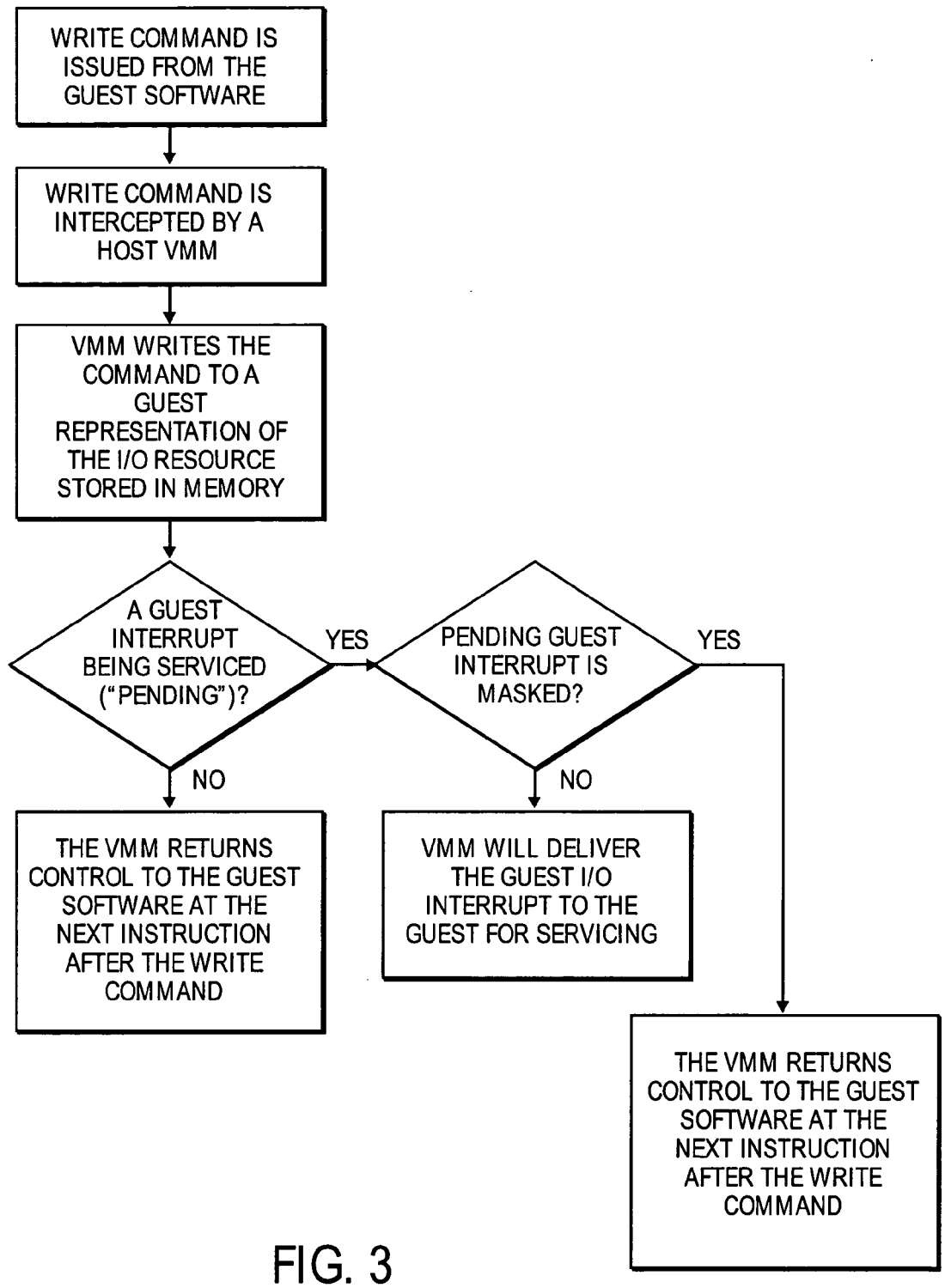
FIG. 3 is a flow diagram illustrating a prior art virtualization technique for assigning priority to I/O interrupts by guest software.
Figure 7:
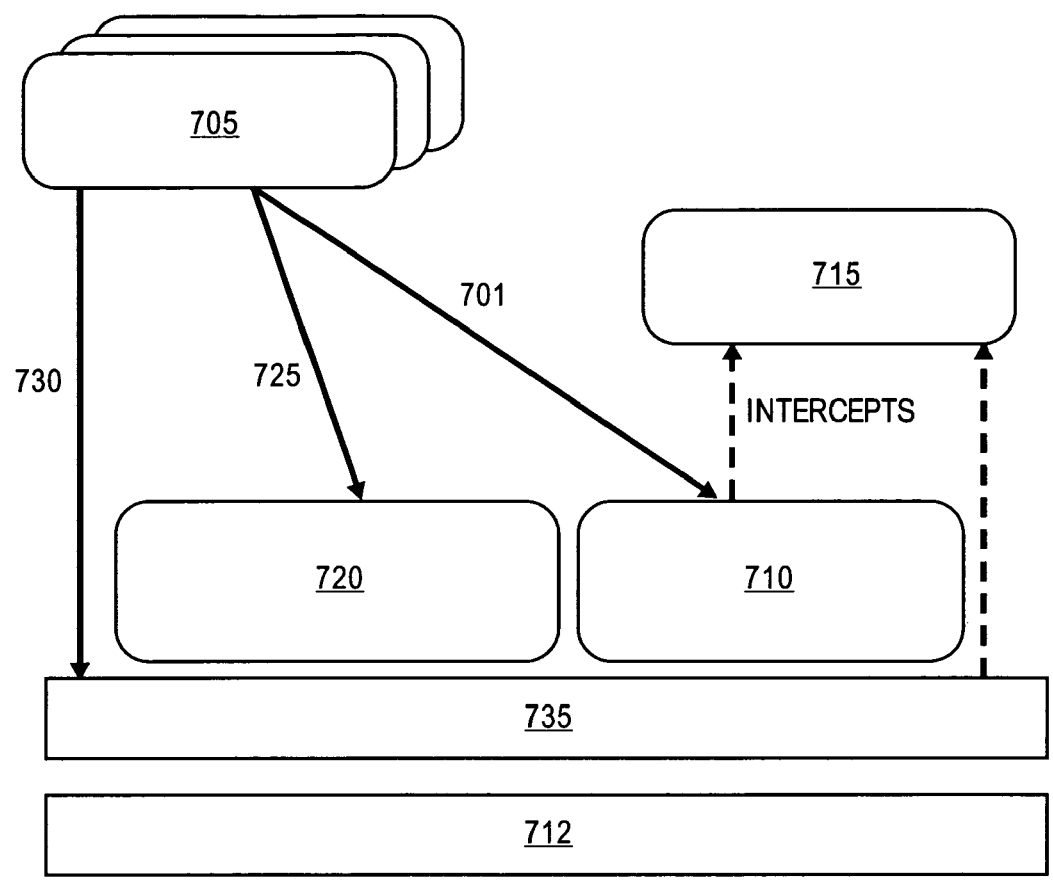
FIG. 7 illustrates a virtual machine (VM) architecture in which at least one embodiment of the invention may be used.

FIG. 7 illustrates a virtualization architecture in which at least one embodiment of the invention may be used. Specifically, FIG. 7 illustrates a guest software 705 from which commands can be issued 701 to a processor 712 having privileged processor resources 710, and may be intercepted by host software, such as a VMM 715, which communicates with the privileged resources on behalf of the guest software. In the virtualization architecture of FIG. 1, the guest software may directly access 725 non-privileged processor resources 720, whereas commands directed from the guest software to privileged processor resources are intercepted by the VMM in accordance with the rules summarized in the above tables. Furthermore, the guest may communicate with the VMM by via accessing 730 a virtual host address table 735, which may be located within a PAL.

Figure 8:
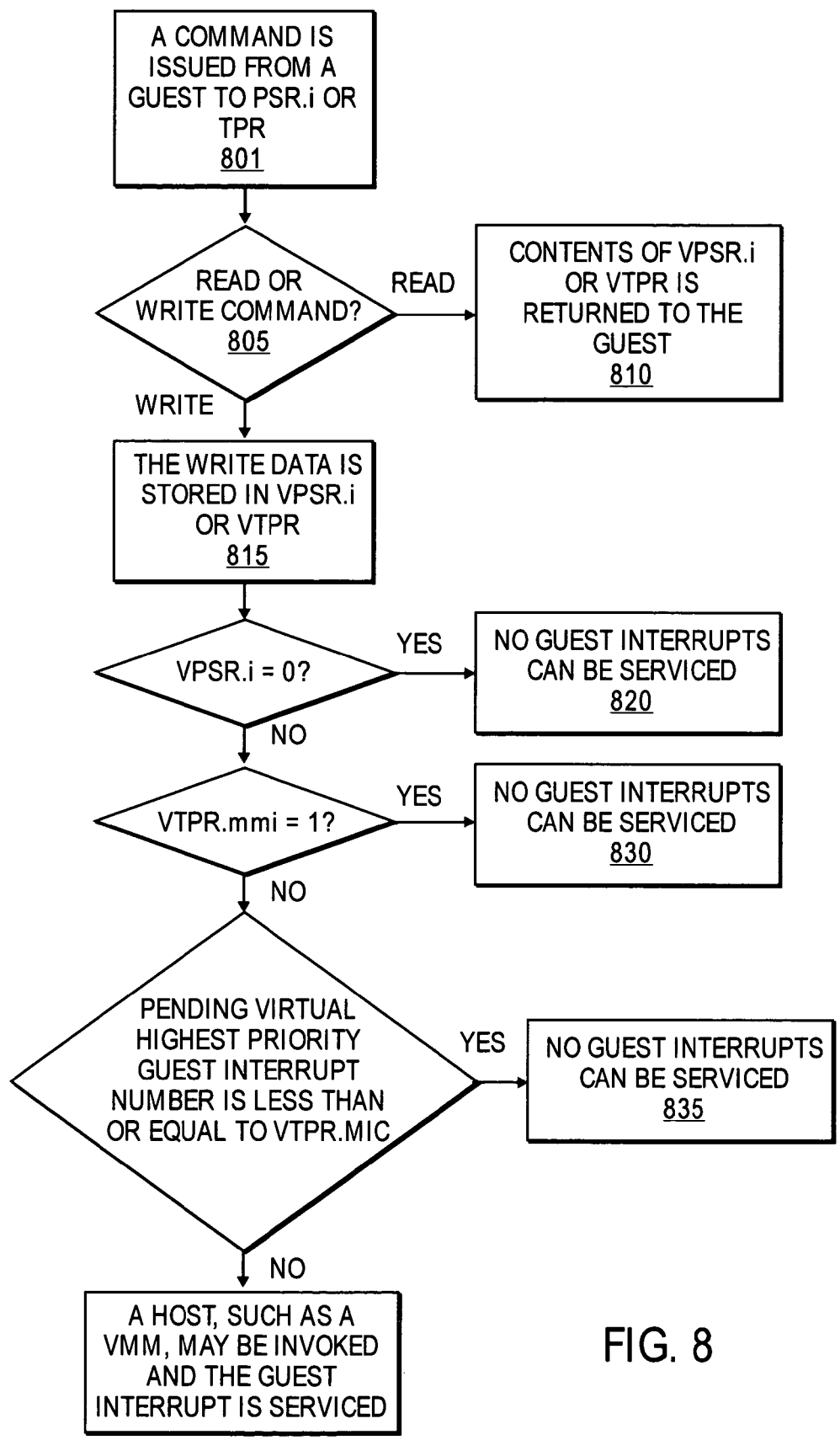
FIG. 8 is a flow diagram illustrating the functionality of a virtual machine in one embodiment of the invention.

FIG. 8 is a flow diagram illustrating the operation of a virtual machine in at least one embodiment of the invention. At operation 801, a command is issued from a guest, in response to an I/O interrupt, for example, to PSR.i or TPR. At operation 805 it is determined whether the command is a read command or a write command. If the command is a read command, the contents of VPSR.i or VTPR is returned to the guest at operation 810, depending on whether the command was a PSR.i read or a TPR read.

If the command is a write command, the write data is stored in VPSR.i or VTPR at operation 815, depending on whether the write command is writing data to PSR.i or TPR, respectively. At operation 820, if VPSR.i=0, then no guest interrupts can be serviced until VPSR.i=1. If VPSR.i=1, however, then at operation 830, if VTPR.mmi=1, then no guest interrupts can be serviced and normal execution of the guest continues at the next instruction following the write command. If VTPR.mmi=0, then at operation 835, if the pending virtual highest priority guest interrupt number ("VHPI number") is less than or equal to VTPR.mic, the interrupt cannot be serviced and is stored until it can be. However, if the VHPI number is greater than VTPR.mic, then at operation 840, the VMM may be invoked to handle the interrupt. In other embodiments, the interrupt may be delivered to the guest without invoking the VMM.

Figure 9:
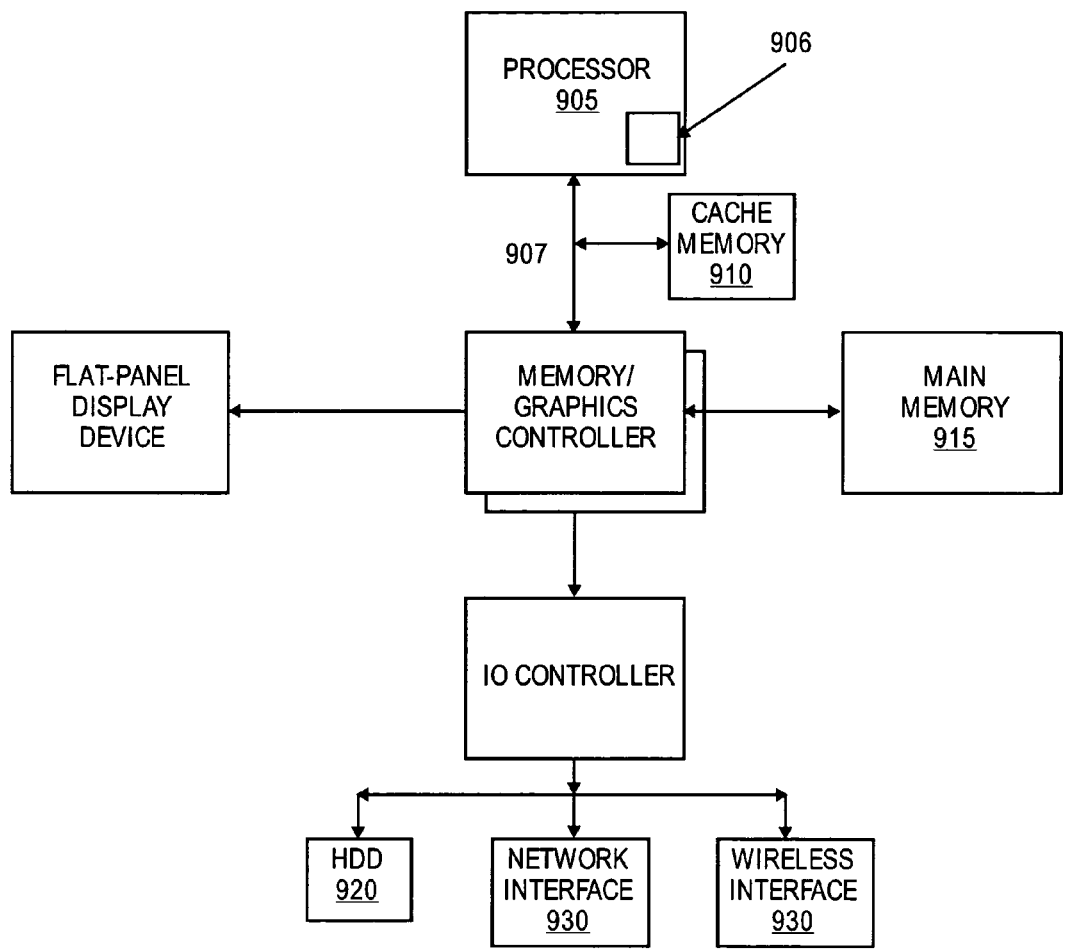
FIG. 9 illustrates a shared-bus computer system in which one embodiment of the invention may be used.

FIG. 9 illustrates a front-side-bus (FSB) computer system in which one embodiment of the invention may be used. A processor 905 accesses data from a level one (L1) cache memory 910 and main memory 915. In other embodiments of the invention, the cache memory may be a level two (L2) cache or other memory within a computer system memory hierarchy. Furthermore, in some embodiments, the computer system of FIG. 9 may contain both a L1 cache and an L2 cache, which comprise an inclusive cache hierarchy in which coherency data is shared between the L1 and L2 caches. In other embodiments, more levels of cache could be used.

Illustrated within the processor of FIG. 9 is one embodiment of the invention 906. In some embodiments, the processor of FIG. 9 may be a multi-core processor.

The main memory may be implemented in various memory sources, such as dynamic random-access memory (DRAM), a hard disk drive (HDD) 920, or a memory source located remotely from the computer system via network interface 930 containing various storage devices and technologies. The cache memory may be located either within the processor or in close proximity to the processor, such as on the processor's local bus 907. Furthermore, the cache memory may contain relatively fast memory cells, such as a six-transistor (6T) cell, or other memory cell of approximately equal or faster access speed.

The computer system of FIG. 9 may be a point-to-point (PtP) network of bus agents, such as microprocessors, that communicate via bus signals dedicated to each agent on the PtP network. Within, or at least associated with, each bus agent is at least one embodiment of invention, such that store operations can be facilitated in an expeditious manner between the bus agents.

Figure 10:
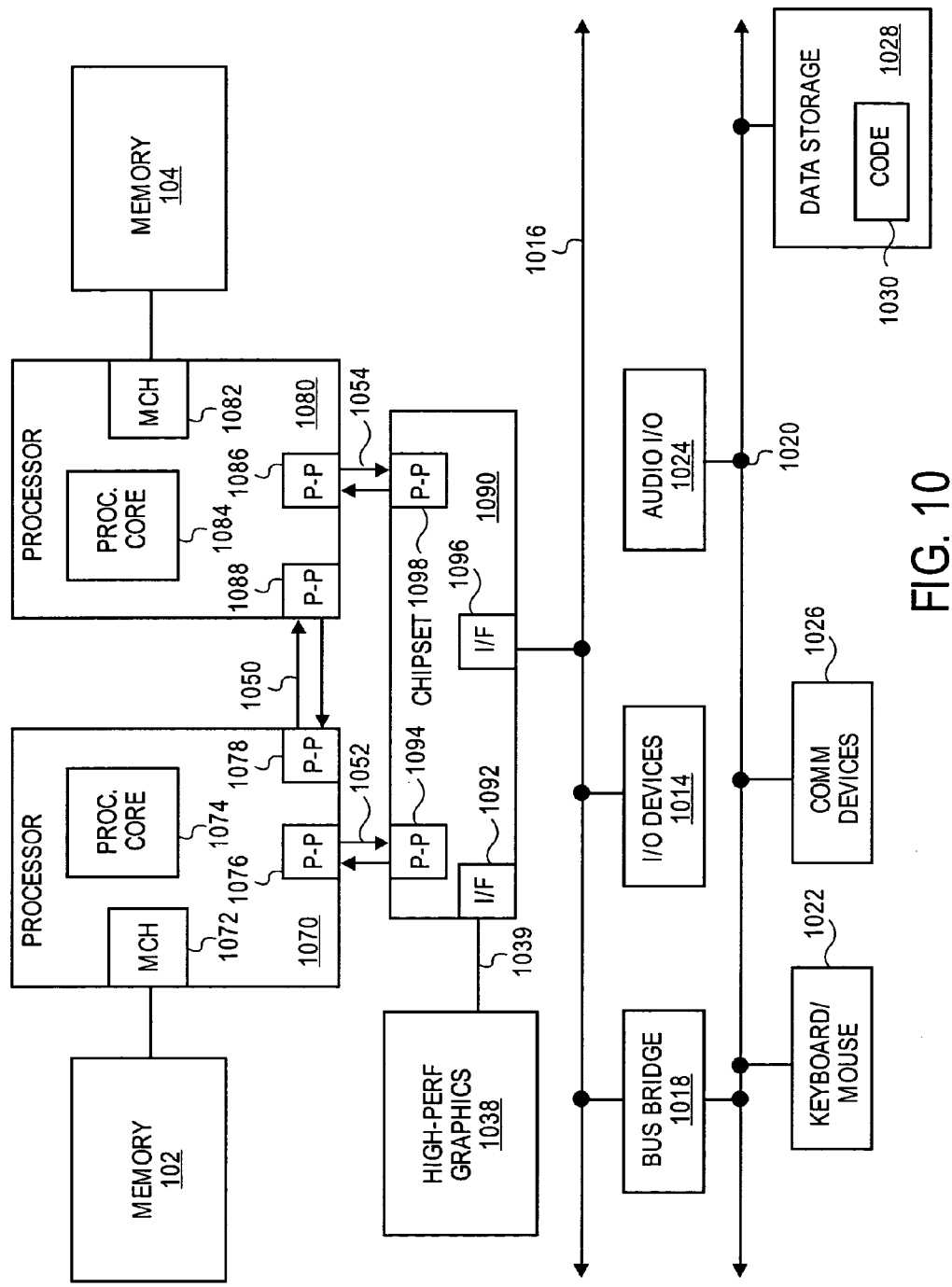
FIG. 10 illustrates a point-to-point bus computer system in which one embodiment of the invention may be used.

FIG. 10 illustrates a computer system that is arranged in a point-to-point (PtP) configuration. In particular, FIG. 10 shows a system where processors, memory, and input/output devices are interconnected by a number of point-to-point interfaces.

The system of FIG. 10 may also include several processors, of which only two, processors 1070, 1080 are shown for clarity. Processors 1070, 1080 may each include a local memory controller hub (MCH) 1072, 1082 to connect with memory 102, 104. Processors 1070, 1080 may exchange data via a point-to-point (PtP) interface 1050 using PtP interface circuits 1078, 1088. Processors 1070, 1080 may each exchange data with a chipset 1090 via individual PtP interfaces 1052, 1054 using point to point interface circuits 1076, 1094, 1086, 1098. Chipset 1090 may also exchange data with a high-performance graphics circuit 1038 via a high-performance graphics interface 1039.

At least one embodiment of the invention may be located within the processors 1070 and 1080. Other embodiments of the invention, however, may exist in other circuits, logic units, or devices within the system of FIG. 10. Furthermore, other embodiments of the invention may be distributed throughout several circuits, logic units, or devices illustrated in FIG. 10.

Embodiments of the invention described herein may be implemented with circuits using complementary metal-oxide-semiconductor devices, or "hardware", or using a set of instructions stored in a medium that when executed by a machine, such as a processor, perform operations associated with embodiments of the invention, or "software". Alternatively, embodiments of the invention may be implemented using a combination of hardware and software.

While the invention has been described with reference to illustrative embodiments, this description is not intended to be construed in a limiting sense. Various modifications of the illustrative embodiments, as well as other embodiments, which are apparent to persons skilled in the art to which the invention pertains are deemed to lie within the spirit and scope of the invention.

What is claimed is:

1. A processor comprising:
   a first storage area to receive a first priority information from a guest operating system running on a virtual machine, the first priority information to indicate that a plurality of a interrupts to the virtual machine are masked, the plurality of interrupts include a first interrupt from a first input/output resource and a second interrupt from a second input/output resource, the first interrupt having a higher priority than the second interrupt;

a second storage area to receive a second priority information from the guest operating system, the second priority information to indicate that the second interrupt is masked by the first interrupt;

a unit to invoke host software system to handle a write command issued by the guest operating system to the second input/output resource only if the first and second priority information is not masking the second interrupt.

2. The processor of claim 1 wherein the host software comprises a virtual machine monitor (VMM) program.

3. A system comprising:

A plurality of virtual machine sharing a plurality of input/output resource, each of the plurality of virtual machines including:

A guest operating system;

A first storage area to receive a first priority information from the guest operating system, the first priority information to indicate that a plurality of interrupts to the virtual machine are masked, the plurality of interrupts including a first interrupt from a first of the plurality of input/output resources and a second interrupt from a second of the plurality of input/output resources, the first interrupt having a higher priority than the second interrupt;

a second storage area to receive a second priority information from the guest operating system, the second priority information to indicate that the second interrupt is masked by the first interrupt;

a logic to prevent a virtual machine monitor (VMM) from being invoked to handle a write command from the guest operating system to the second input/output resource if the first and second priority information are masking the second interrupt.

4. The system of claim 3 wherein each virtual machine comprises a copy of the input/output (I/O) resources, accessible by the guest operating system.

5. The system claim of claim 4 wherein at least some of the copy of I/O resources comprises a virtual task priority register to store bits to indicate which interrupts, if any, are masked based on their respective priorities.

6. The system claim 5 wherein the at least some of the copy of I/O resources comprise a virtual task priority register to store bits to indicate which interrupts, if any, are masked based on their respective priorities.

7. A method comprising:

receiving a write command from a guest a software module to a processor input/output resource, the guest software running on a virtual machine;

storing data associated with the write command into a shadow copy of the processor input/output resource;

preventing a virtual machine monitor (VMM) from being invoked to handle the write a command if first and second priority information are masking a first interrupt from the processor input/output resource, the first priority information to indicate that a plurality of interrupts to the virtual machine are masked the plurality of interrupts including the first interrupt, the second priority information to indicate that the first interrupt is masked by a second interrupt having a higher priority than the first interrupt.

8. The method of claim 7 wherein the VMM is to deliver the first interrupt to the guest software module if the first interrupt is to be unmasked by the write command.

9. The method of claim 8 wherein if the write command in not to cause the first interrupt to become unmasked, the guest software continues to execute in program order from the point at which the write command occurred.

* * * * *